(12) United States Patent
On et al.

(10) Patent No.: US 11,203,897 B2
(45) Date of Patent: Dec. 21, 2021

(54) WIRELESS ELECTRIC CURTAIN CONTROL SYSTEM

(71) Applicant: Dongguang Keetat Lighting Ltd., Dongguan (CN)

(72) Inventors: Ka Yiu On, Dongguan (CN); Yanliang Chen, Dongguan (CN); Jianming Zeng, Dongguan (CN); Lanyu Li, Dongguan (CN)

(73) Assignee: Dongguang Keetat Lighting Ltd., Dongguan (CN)

( * ) Notice: Subject to any disclaimer, the term of this patent is extended or adjusted under 35 U.S.C. 154(b) by 289 days.

(21) Appl. No.: 16/450,392

(22) Filed: Jun. 24, 2019

(65) Prior Publication Data
US 2020/0332594 A1  Oct. 22, 2020

(30) Foreign Application Priority Data
Apr. 19, 2019  (CN) .......................... 201910318456.5

(51) Int. Cl.
*E06B 9/322*  (2006.01)
*E06B 9/42*  (2006.01)
(Continued)

(52) U.S. Cl.
CPC ............... *E06B 9/322* (2013.01); *E06B 9/42* (2013.01); *E06B 9/72* (2013.01); *F21V 23/003* (2013.01); *G08C 17/00* (2013.01); *H02J 7/00* (2013.01); *H02J 7/0047* (2013.01); *H02J 7/35* (2013.01); *H02K 7/116* (2013.01); *H04B 7/15* (2013.01);
(Continued)

(58) Field of Classification Search
CPC ... E06B 9/322; E06B 9/42; E06B 9/72; E06B 9/38; E06B 2009/6809; F21V 23/003; G08C 17/00; H02J 7/00; H02J 7/0047; H02J 7/35; H02J 7/116; H02K 7/116; H04B 7/15; F21Y 2113/13; F21Y 2103/10
See application file for complete search history.

(56) References Cited

U.S. PATENT DOCUMENTS 6,812,662 B1 * 11/2004 Walker .................... E06B 9/322
                                                                  136/243
9,810,020 B2 * 11/2017 Adams .............. H04W 52/0245
(Continued)

FOREIGN PATENT DOCUMENTS

CN         204654547    *  9/2015   ............... A47H 5/02
EP         3726697 A1  * 10/2020   ............ H02J 7/0047

*Primary Examiner* — Beth A Stephan
(74) *Attorney, Agent, or Firm* — Wang Law Firm, Inc.

(57) ABSTRACT

A wireless electric curtain control system includes a smart curtain, a wireless repeater and a remote control. The remote control is for sending a control signal to the wireless repeater; the wireless repeater is for receiving and sending the control signal to the smart curtain; the smart curtain includes a curtain body, a motor module and a wireless module; the wireless module is for receiving and feeding back the control signal of the wireless repeater to a motor module; the motor module controls the operation of the curtain body according to the control signal received by the wireless module. The wireless repeater sends the control signal to the wireless module of the smart curtain to control the motor module and the smart curtain and increase the signal transmission distance between the smart curtain and the remote control via a wireless transmission.

9 Claims, 17 Drawing Sheets

(51) Int. Cl.
   *E06B 9/72*   (2006.01)
   *F21V 23/00*  (2015.01)
   *G08C 17/00*  (2006.01)
   *H02J 7/00*   (2006.01)
   *H02J 7/35*   (2006.01)
   *H02K 7/116*  (2006.01)
   *H04B 7/15*   (2006.01)
   *F21Y 113/13* (2016.01)
   *F21Y 103/10* (2016.01)
   *F21Y 115/10* (2016.01)
   *E06B 9/38*   (2006.01)
   *E06B 9/68*   (2006.01)

(52) U.S. Cl.
   CPC ......... *E06B 9/38* (2013.01); *E06B 2009/6809* (2013.01); *F21Y 2103/10* (2016.08); *F21Y 2113/13* (2016.08); *F21Y 2115/10* (2016.08)

(56) References Cited

U.S. PATENT DOCUMENTS

| | | | |
|---|---|---|---|
| 9,999,313 B2* | 6/2018 | Mullet | E06B 9/68 |
| 2004/0250964 A1* | 12/2004 | Carmen, Jr. | H05B 47/165 |
| | | | 160/120 |
| 2009/0058663 A1* | 3/2009 | Joshi | H04L 67/12 |
| | | | 340/584 |
| 2009/0308543 A1* | 12/2009 | Kates | E06B 9/50 |
| | | | 160/5 |
| 2017/0191311 A1* | 7/2017 | Mullet | A47H 5/02 |
| 2017/0241200 A1* | 8/2017 | Feldstein | H04L 12/283 |
| 2017/0260806 A1* | 9/2017 | Adams | E06B 9/42 |
| 2019/0100961 A1* | 4/2019 | Kutell | E06B 9/50 |

\* cited by examiner

WIRELESS ELECTRIC CURTAIN CONTROL SYSTEM

FIELD OF THE INVENTION

The present invention relates to the technical field of electric curtains, and more particularly to a wireless electric curtain control system.

BACKGROUND OF THE INVENTION

In general, a conventional commercial curtain controller controls its circuit by a simple power switch and/or button and just provides a basic curtain function only, but not a smart or wireless control function. As the people's living standard improves, people gradually pursue a high-quality lifestyle and ordinary curtains can no longer meet our requirement. Furthermore, ordinary curtains can only be controlled manually, and they provide only one operating mode and cannot be controlled automatically by a wireless device. This will bring tremendous inconvenience to our lives. Therefore, it is an important subject for related manufactures to solve the problem like this.

SUMMARY OF THE INVENTION

It is a primary objective of the present invention to provide a wireless electric curtain control system to overcome the aforementioned drawbacks of the prior art.

To achieve the aforementioned and other objectives, the present invention provides a wireless electric curtain control system comprising a smart curtain, a wireless repeater and a remote control; the remote control is provided for sending a control signal to the wireless repeater; the wireless repeater is provided for receiving the control signal for remote control and sending the control signal to the smart curtain; the smart curtain comprises a curtain body, a motor module, and a wireless module; the wireless module is provided for receiving the control signal of the wireless repeater and feeding back the control signal to the motor module; and the motor module controls the operation of the curtain body according to the control signal received by the wireless module.

In the present invention, the smart curtain comprises a solar module, a battery and a charging circuit provided for a solar module to charge the battery.

The charging circuit comprises a charging chip U3; the charging chip U3 has an interface P3 disposed at an input terminal thereof; the interface P3 is coupled to the solar module; the charging chip U3 has an interface P2 disposed at an output terminal thereof; the interface P2 is coupled to the battery; and the charging circuit has a first indicating light for indicating the charging status of the battery.

In the present invention, the smart curtain further comprises a regulator module and a press button control module; the regulator module comprises a voltage regulator chip U2; the wireless module comprises a Zigbee chip U1; the press button control module comprises an ascending button S1 and a descending button S2; the voltage regulator chip U2 has an input terminal coupled to the battery; the voltage regulator chip U2 has an output terminal coupled to a power terminal of the Zigbee chip U1; the ascending button S1 and descending button S2 are coupled to two input terminal of the Zigbee chip U1 respectively; both ends of the ascending button S1 and both ends of the descending button S2 are coupled to a power supply and grounded; the Zigbee chip U1 has an output terminal coupled to an interface P1; and the interface P1 is coupled to the motor module.

In the present invention, the wireless repeater comprises a repeater housing for installing a Zigbee chip U5 and a voltage regulator chip U4 therein; the voltage regulator chip U4 has an input terminal coupled to a power supply; the voltage regulator chip U4 has an output terminal coupled to a power terminal of the Zigbee chip U5; the wireless repeater further comprises a second indicating light for indicating the operating status of the wireless repeater; and the second indicating light is installed onto a surface of the repeater housing.

In the present invention, the remote control comprises a remote control housing, and a control module, an antenna ANT, a first switch module, a second switch module and a third switch module which are installed in the remote control housing; the control module comprises a control chip U6; the control chip U6 has an output terminal coupled to the antenna ANT; the first switch module, the second switch module and the third switch module have a first switch, a second switch and a third switch respectively; the first switch, the second switch and the third switch are coupled to an input terminal of a control chip U6; the remote control further comprises a flash memory chip U7; and the flash memory chip U7 is coupled to the control chip U6.

In a first embodiment of the present invention, the smart curtain comprises a first casing; the curtain body is coupled to the first casing; the motor module is disposed at the middle of the first casing; both ends of the motor module have a first reel and a second reel respectively; the battery and the wireless module are installed at an end of the first casing; the first reel and the second reel are transmitted with and coupled to the motor module; both of the first reel and the second reel are wound with a drawstring; the first casing has a threading hole; and the drawstring is coupled to the curtain body after passing through the threading hole.

In the present invention, a light strip is embedded between the curtain body and the first casing; the light strip has a light emitting diode (LED) installed therein; the first casing has an LED driving module installed therein for driving the light emitting diode (LED) to emit light; the Zigbee chip U1 is provided for controlling the operation of the LED driving module; the light emitting diode (LED) comprises a R_LED, a G_LED and a B_LED; the LED driving module comprises a MOS tube Q4, a MOS tube Q5 and a MOS tube Q6; the R_LED, G_LED and B_LED are coupled to the output terminal of the Zigbee chip U1 after passing through the MOS tube Q6, the MOS tube Q5, and the MOS tube Q4 respectively.

In the present invention, the first casing is coupled to an external power adaptor; the power adaptor is provided for supplying power to the wireless module; the motor module has an output terminal coupled to a first gear; the second reel has an input terminal coupled to a second gear which is engaged with the first gear; and the second reel and the first reel are transmitted coaxially; the first casing has a first cover and a first battery compartment for accommodating the battery; the first cover has an end hinged to an end of the first battery compartment; the other end of the first cover has a first elastic hook; and the other end of the first battery compartment has a first slot engaged with the first elastic hook; and the first battery compartment is made of plastic.

In a second embodiment of the present invention, the smart curtain comprises a second casing and a rotating shaft rotatably coupled to the second casing; the curtain body is wound on the rotating shaft; the motor module, the battery and the wireless module are installed in the second casing;

the motor module has an output terminal transmitted with and coupled to the rotating shaft; and the smart curtain further comprises a fixing mechanism for fixing the second casing.

In the present invention, the fixing mechanism comprises an upper clamp and a lower clamp detachably coupled to the upper clamp; the upper clamp has an upper clamping plate disposed at the top thereof; the lower clamp has a lower clamping plate disposed at the bottom thereof; the upper clamp has a snap slot; the lower clamp has an a pushing block and an elastic snap block corresponding to the snap slot; a return spring is installed between the pushing block and the upper clamp; the second casing has a second cover and a second battery compartment for accommodating the battery; the second cover has an end hinged to an end of the second battery compartment; the second cover has a second elastic hook disposed at the other end thereof; the other end of the second battery compartment has a second slot engaged with the second elastic hook; the second battery compartment has an arc guide slot provided for guiding the second cover to turn and move out from the second battery compartment; and the second battery compartment is made of plastic.

The present invention has the following advantages: The wireless repeater transmits the control signal to the wireless module of the smart curtain to control the motor module by remote control without the need of transmitting signals between the wireless module of the smart curtain and the motor module continuously all the time, and thus the invention can save the power consumption of the smart curtain. When the smart curtain is not in use, the wireless module and the motor module of the smart curtain are in the power-saving sleep mode. After the remote control transmits the control signal to the wireless repeater, the wireless repeater sends a command to the wireless module of the smart curtain to control and turn on the wireless module and the motor module in order to control the curtain body to be released or rewound and to extend the standby duration of the smart curtain. In addition, this embodiment uses a repeater as a connecting member of the smart curtain and the remote control to increase the signal transmission distance between the smart curtain and the remote control via wireless transmission.

Figure 1:
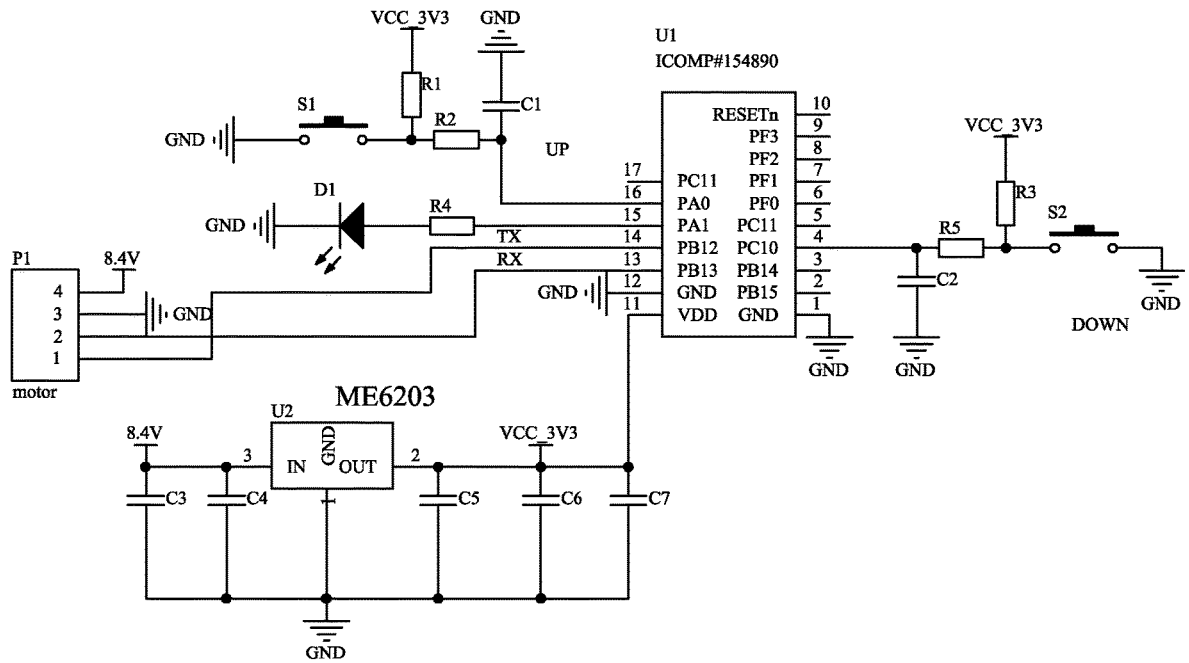
FIG. 1 is a circuit diagram of a wireless module of the present invention.

Wherein, a brief description of the components represented by their respective numerals in the drawings is given below. 1: curtain body; 2: motor module; 3: battery; 4: first indicating light; 5: repeater housing; 51: second indicating light; 6: remote control housing; 61: first switch; 62: second switch; 63: third switch; 7: first casing; 71: threading hole; 72: first reel; 73: second reel; 74: drawstring; 75: power adaptor; 76: light strip; 77: first gear; 78: second gear; 79: first battery compartment; 791: first cover; 792: first elastic hook; 793: first slot; 8: second casing; 81: rotating shaft; 82: fixing mechanism; 83: upper clamp; 84: upper clamping plate; 85: snap slot; 86: return spring; 87: lower clamp; 88: lower clamping plate; 89: elastic snap block; 9: second battery compartment; 91: second cover; 92: second elastic hook; 93: second slot; and 94: arc guide slot.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 2:
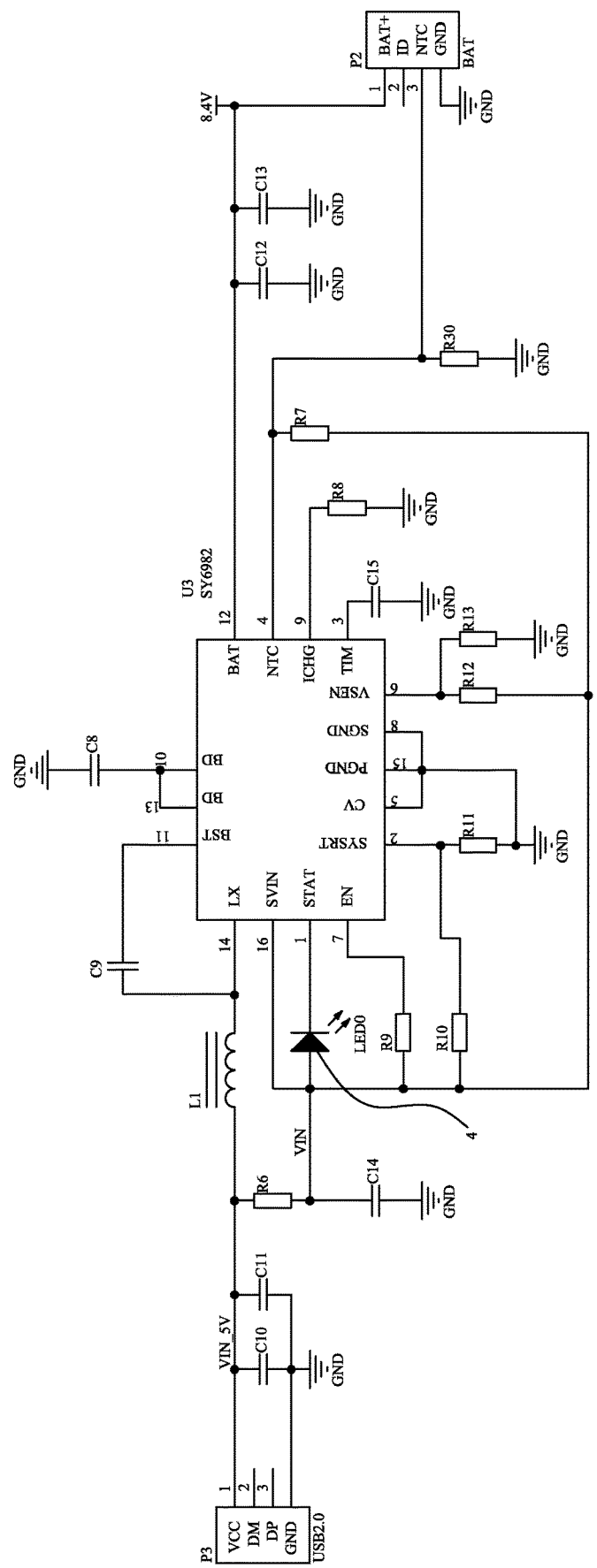
FIG. 2 is a circuit diagram of a charging circuit of the present invention.
Figure 3:
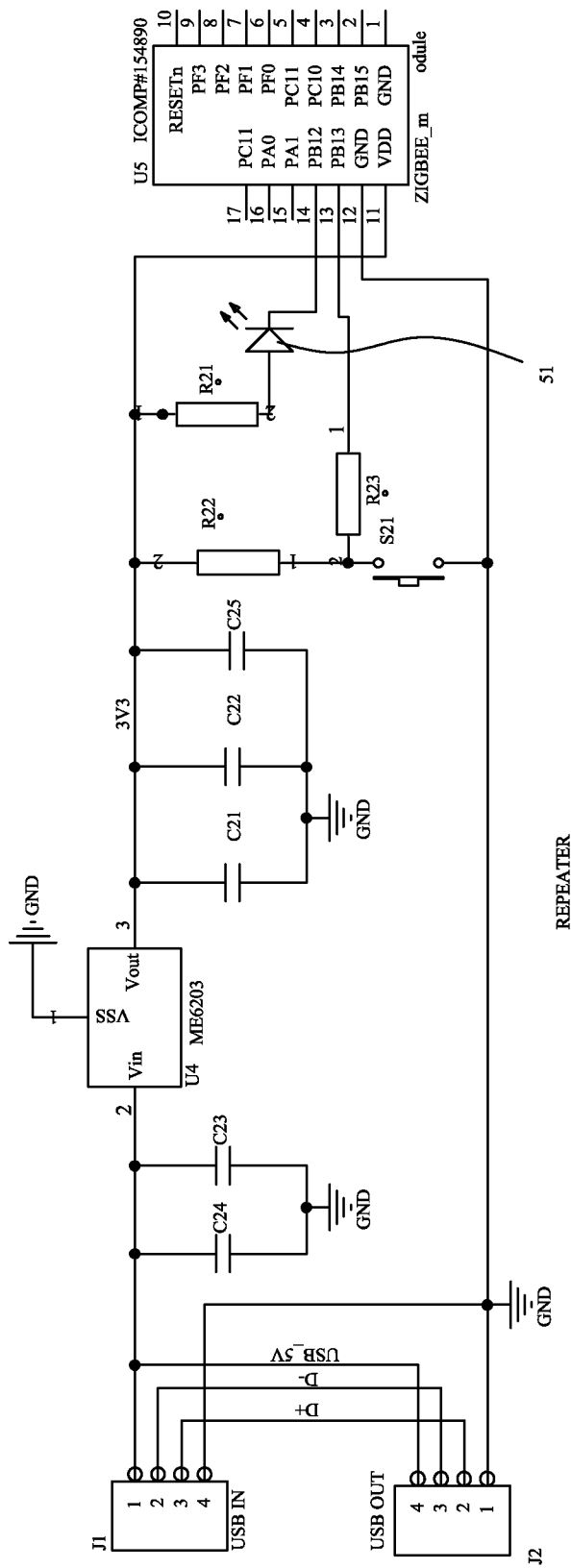
FIG. 3 is a circuit diagram of a circuit including a Zigbee chip U5 and a voltage regulator chip U4 in accordance with the present invention.
Figure 4:
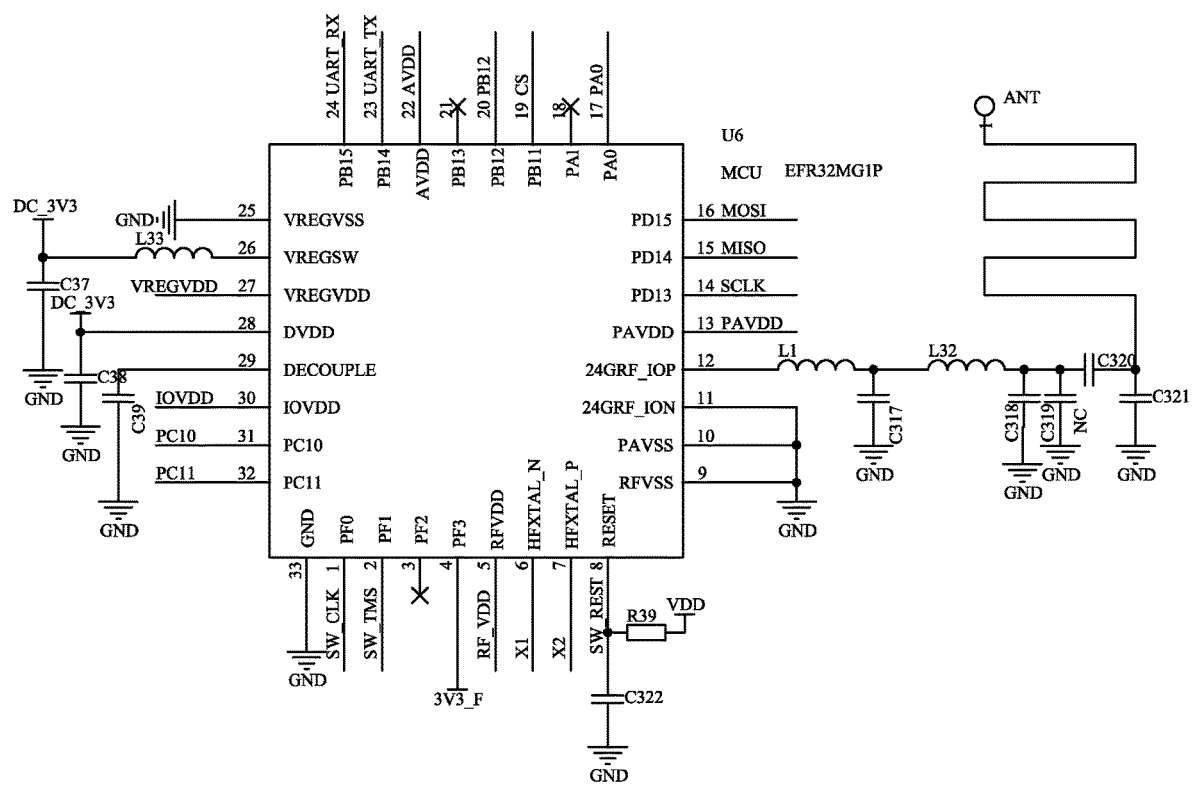
FIG. 4 is a circuit diagram of a control module of the present invention.
Figure 5:
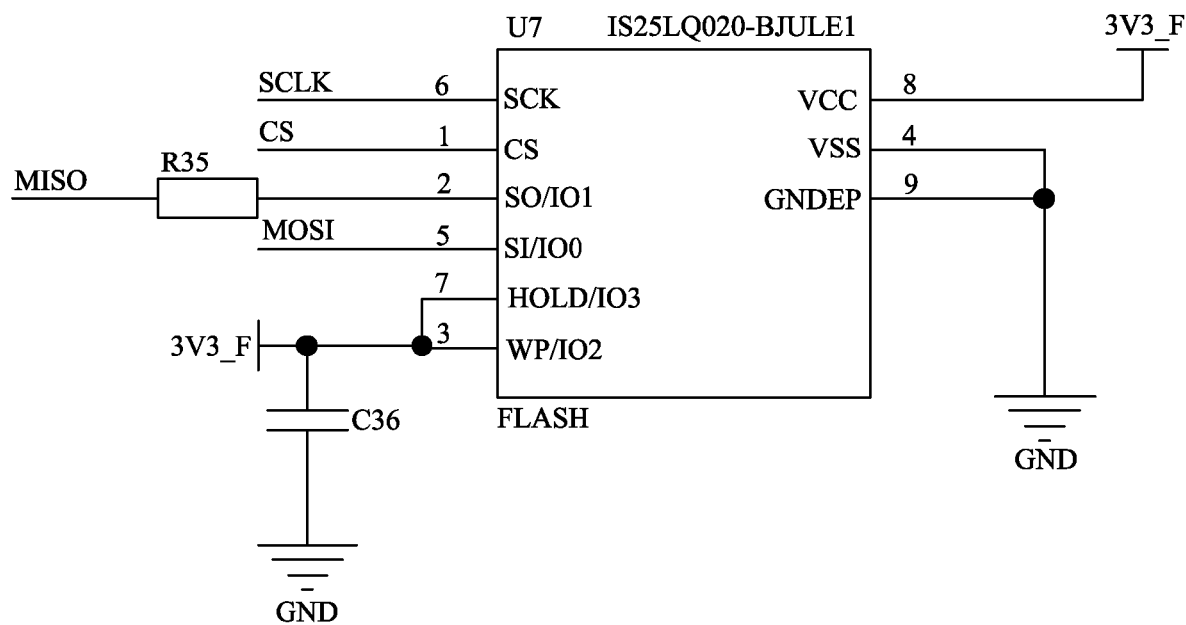
FIG. 5 is a circuit diagram of a flash memory chip U7 of the present invention.
Figure 6:
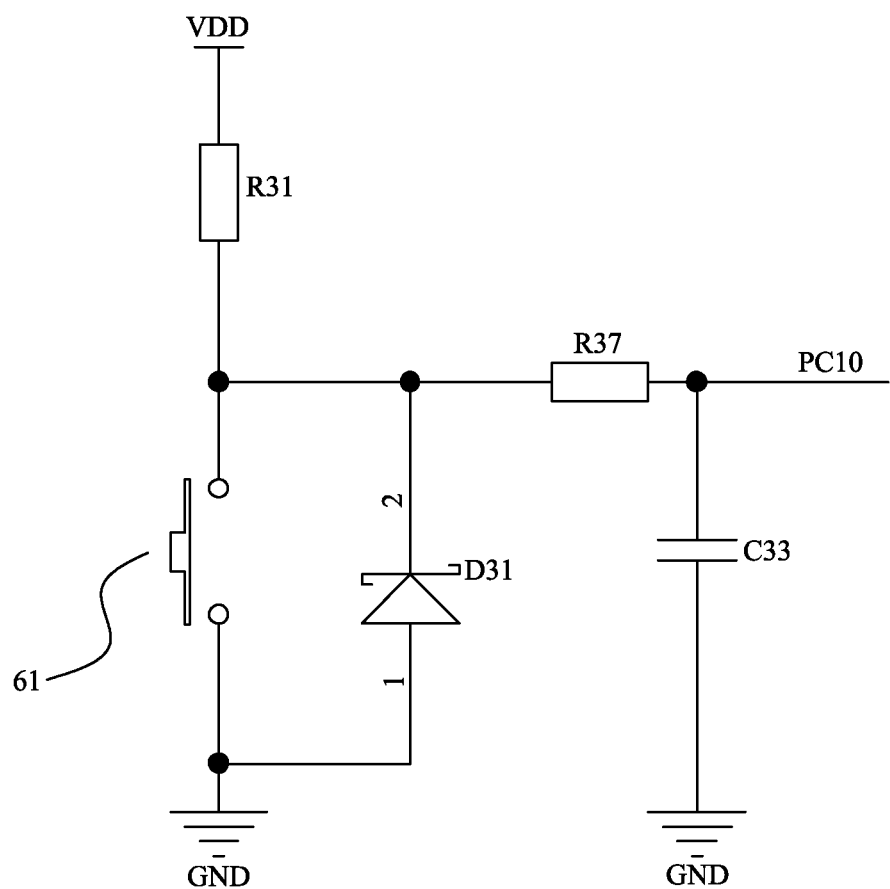
FIG. 6 is a circuit diagram of a first switch module of the present invention.
Figure 7:
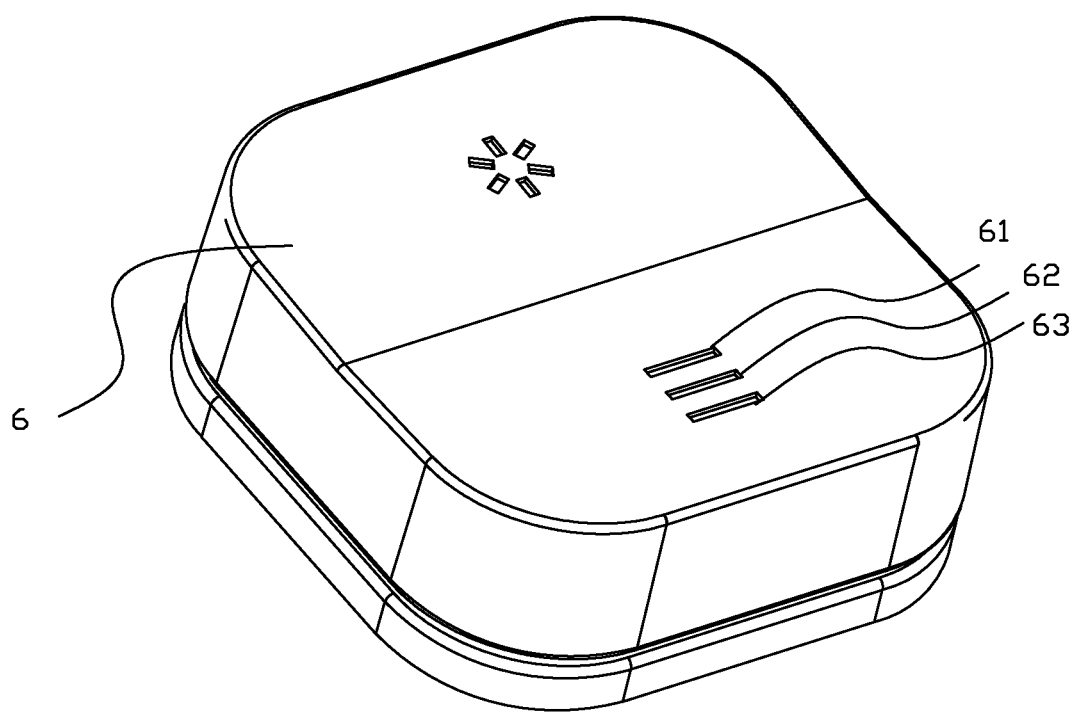
FIG. 7 is a perspective view of a remote control of the present invention.
Figure 8:
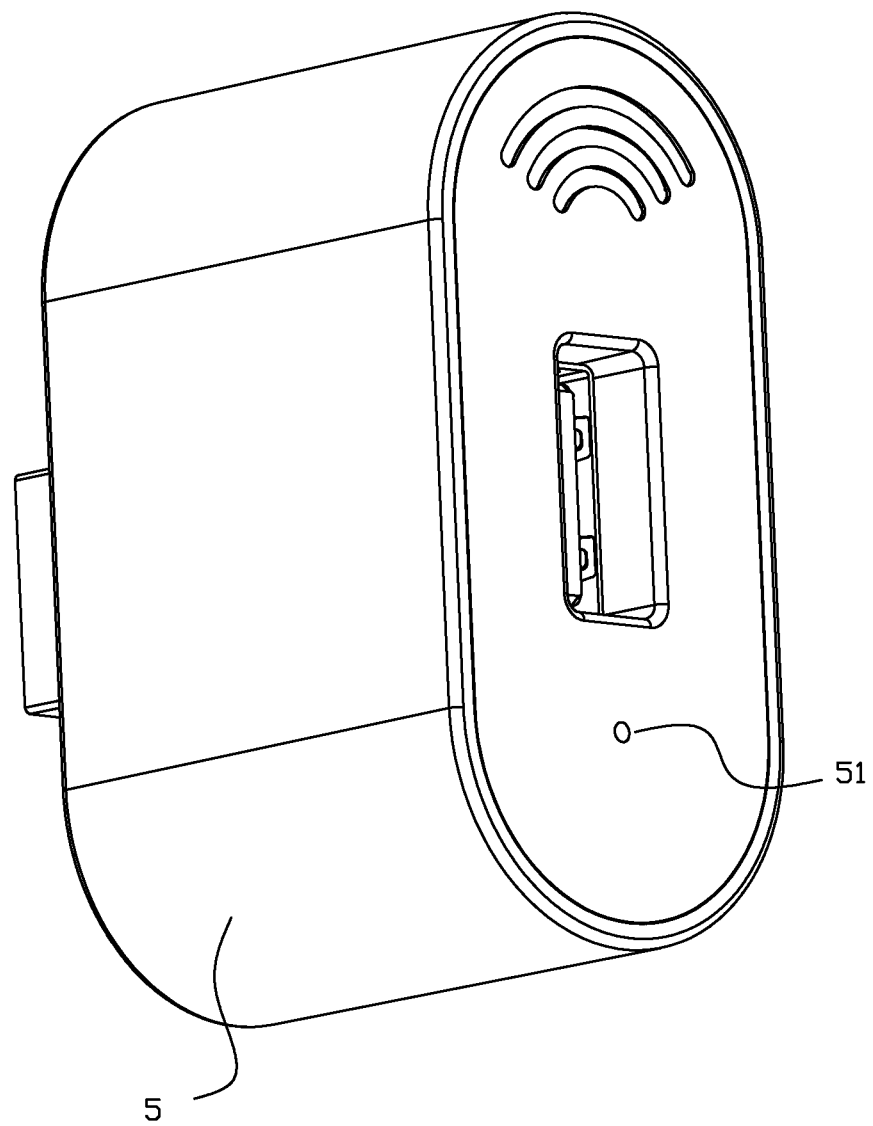
FIG. 8 is a perspective view of a wireless repeater of the present invention.

With reference to FIGS. 1 to 8 for a wireless electric curtain control system in accordance with an embodiment of the present invention, the wireless electric curtain control system comprises a smart curtain, a wireless repeater and a remote control; the remote control is provided for sending a control signal to the wireless repeater; the wireless repeater is provided for receiving the control signal for remote control and sending the control signal to the smart curtain.

The smart curtain comprises a curtain body 1, a motor module 2 and a wireless module, wherein the motor module 2 has a MCU installed therein; the wireless module is for receiving the control signal of a wireless repeater and feeding back the control signal to the motor module 2; and the motor module 2 controls the operation of the curtain body 1 according to the control signal received by the wireless module.

Specifically, the wireless electric curtain control system of this embodiment uses a remote control to send the control signal from the wireless repeater to the wireless module of the smart curtain in order to control the motor module 2 without the need of transmitting signals between the wireless module of the smart curtain and the motor module 2 continuously all the time, and thus the invention can save the power consumption of the smart curtain.

When the smart curtain is not in use, the wireless module and the motor module 2 of the smart curtain are in the power-saving sleep mode. After the remote control transmits the control signal to the wireless repeater, the wireless repeater sends a command to the wireless module of the smart curtain to control and turn on the wireless module and the motor module 2 in order to control the curtain body to be released or rewound and to extend the standby duration of the smart curtain. In addition, this embodiment uses a repeater as a connecting member of the smart curtain and the remote control to increase the signal transmission distance between the smart curtain and the remote control via wireless transmission.

In the wireless electric curtain control system of this embodiment, the smart curtain comprises a solar module, a battery 3, and a charging circuit provided for the solar module to charge the battery 3. Wherein, the solar module is not shown in the figure.

The charging circuit comprises a charging chip U3; the charging chip U3 has an interface P3 at an input terminal thereof; the interface P3 is coupled to the solar module; the charging chip U3 also has an interface P2 at an output terminal thereof; the interface P2 is coupled to the battery 3.

The charging circuit has a first indicating light 4 for the charging status of the indicating battery 3.

In the wireless electric curtain control system of this embodiment, the solar module is provided for charging the battery 3. Firstly, the interface P3 is a USB interface, and a 5V power of the solar module enters into an input terminal of the charging chip U3 through the interface P3, wherein the model number of the charging chip U3 is SY6982; the charging chip U3 converts the 5V power of the solar module into 8.4V power provided for charging the battery 3 through the interface P2, wherein the interface P2 may be a USB interface of the battery compartment, and the first indicating light 4 is provided for indicating the charging status of the battery 3.

In the wireless electric curtain control system of this embodiment, the smart curtain further comprises a regulator module and a press button control module.

The regulator module comprises a voltage regulator chip U2; the wireless module comprises a Zigbee chip U1; the press button control module comprises an ascending button S1 and a descending button S2; the voltage regulator chip U2 has an input terminal coupled to the battery 3; the voltage regulator chip U2 has an output terminal coupled to a power terminal of the Zigbee chip U1; the ascending button S1 and the descending button S2 are coupled to two input terminals of the Zigbee chip U1 respectively; both ends of the ascending button S1 and both ends of the descending button S2 are coupled to the power supply and grounded; the Zigbee chip U1 has an output terminal coupled to an interface P1; and the interface P1 is coupled to the motor module 2.

Specifically, the 8.4V power outputted from the battery 3 is passed through the voltage regulator chip U2 and then supplied to the Zigbee chip U1, wherein the model number of the voltage regulator chip U2 is ME6203.

When it is necessary to release or rewind the curtain body 1, a user may use a remote control to send a control signal from the wireless repeater to the curtain body 1, and the Zigbee chip U1 receives and processes a command, and then sends the processed command (which is a serial command) through the interface P1 to the motor module 2 to rotate the motor module 2 in a forward or reverse direction.

In addition, the wireless electric curtain control system of this embodiment comprises the ascending button S1 and the descending button S2, so that users can control the motor module 2 manually for a forward rotation or a reverse rotation.

In the wireless electric curtain control system of this embodiment, the wireless repeater comprises a repeater housing 5, and a Zigbee chip U5 and a voltage regulator chip U4 which are installed in the repeater housing 5, wherein the model number of the voltage regulator chip U4 is ME6203; the voltage regulator chip U4 has an input terminal coupled to a power supply; the voltage regulator chip U4 has an output terminal coupled to a power terminal of the Zigbee chip U5; the wireless repeater further comprises a second indicating light 51 for indicating the operating status of the wireless repeater; and the second indicating light 51 is installed on a surface of the repeater housing 5.

Specifically, after the remote control sends a control signal, the Zigbee chip U5 of the wireless repeater receives and transfers the control signal to a Zigbee chip U1 of the smart curtain, and the second indicating light 51 is provided to facilitate users to observe the operating status of the wireless repeater.

In the wireless electric curtain control system of this embodiment, the remote control comprises a remote control housing 6, and a control module, an antenna ANT, a first switch module, a second switch module and a third switch module which are installed in the remote control housing 6; the control module comprises a control chip U6; the control chip U6 has an output terminal coupled to the antenna ANT; the first switch module, the second switch module and the third switch module have a first switch 61, a second switch 62 and a third switch 63 respectively; and the first switch 61, the second switch 62 and the third switch 63 are coupled to an input terminal of the control chip U6, wherein the control chip U6 is a single chip with a model number of EFR32MG1P.

The remote control further comprises a flash memory chip U7; and the flash memory chip U7 is coupled to the control chip U6.

Specifically, when a user wants to operate the wireless control smart curtain, the user presses the first switch 61, the second switch 62 or the third switch 63. After receiving a signal of the first switch 61, the second switch 62 or the third switch 63, the control chip U6 outputs a control signal through the antenna ANT to the wireless repeater to control the smart curtain via wireless control.

Figure 9:
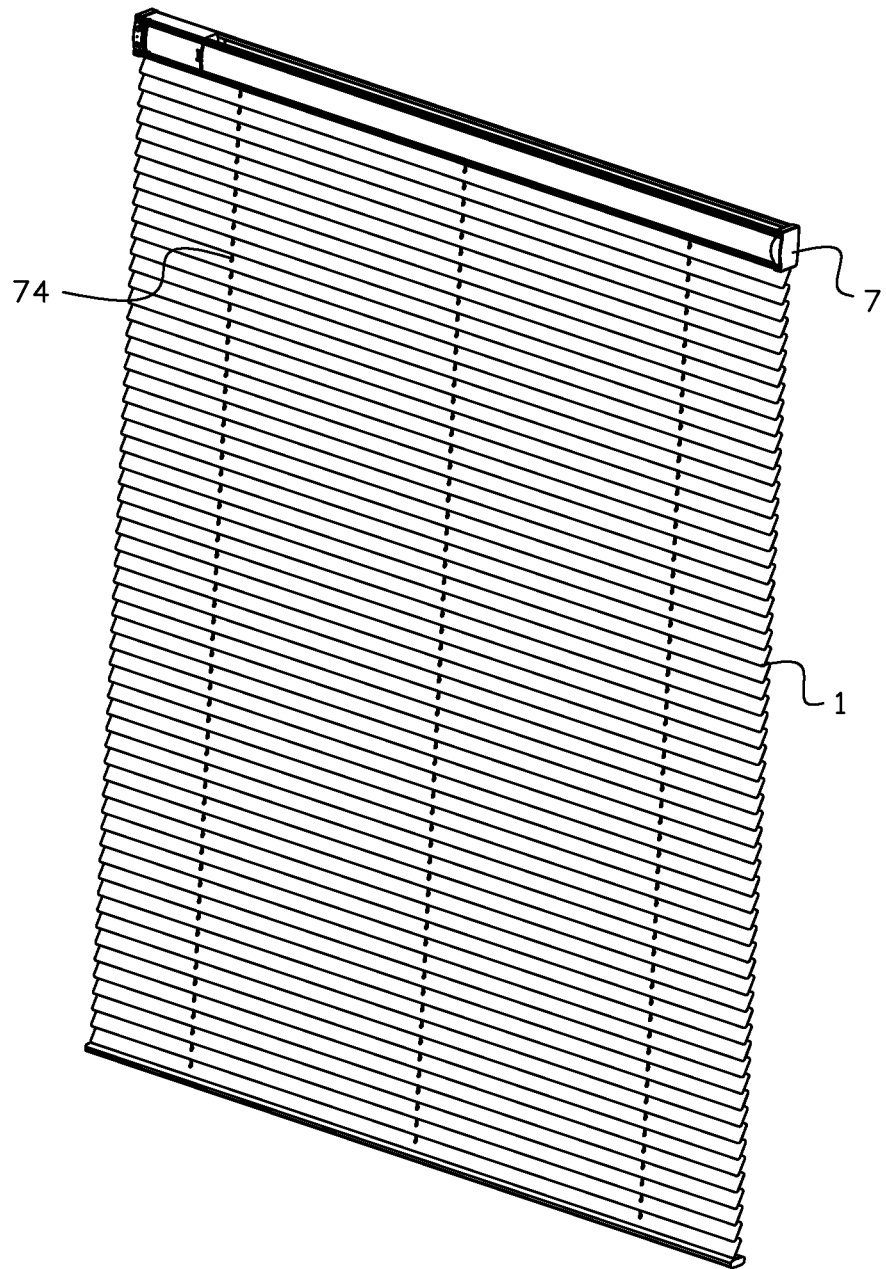
FIG. 9 is a schematic view showing a first casing and a curtain body of a first embodiment of the present invention.
Figure 10:
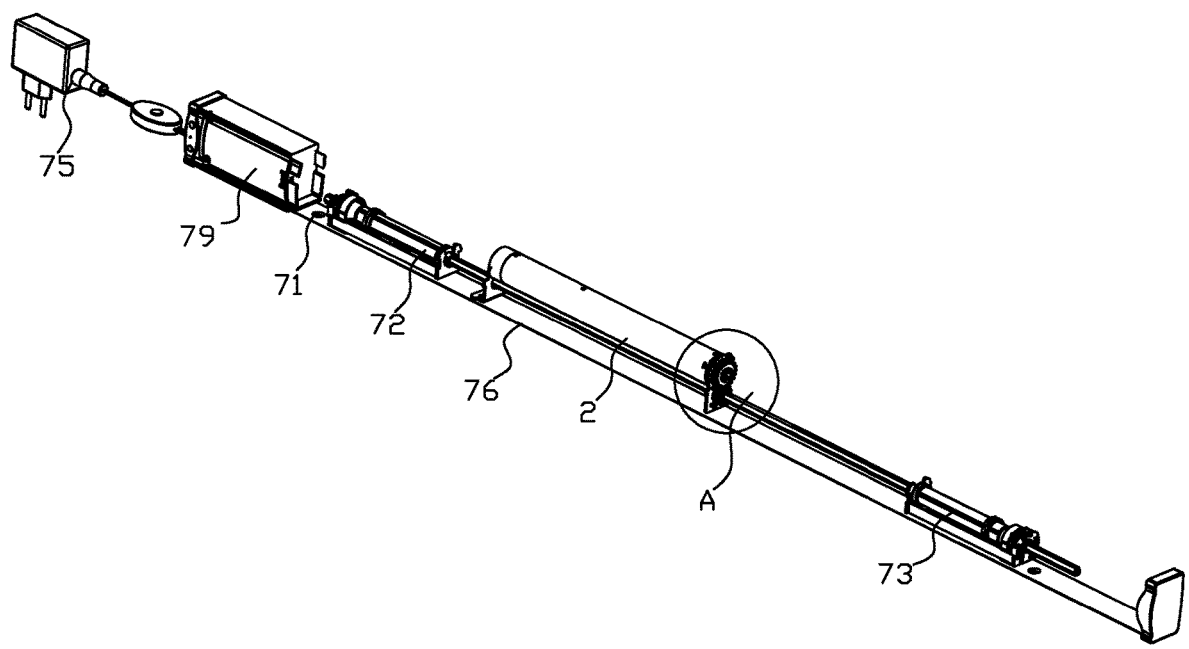
FIG. 10 is a schematic view showing the internal structure of a first casing of the present invention.
Figure 11:
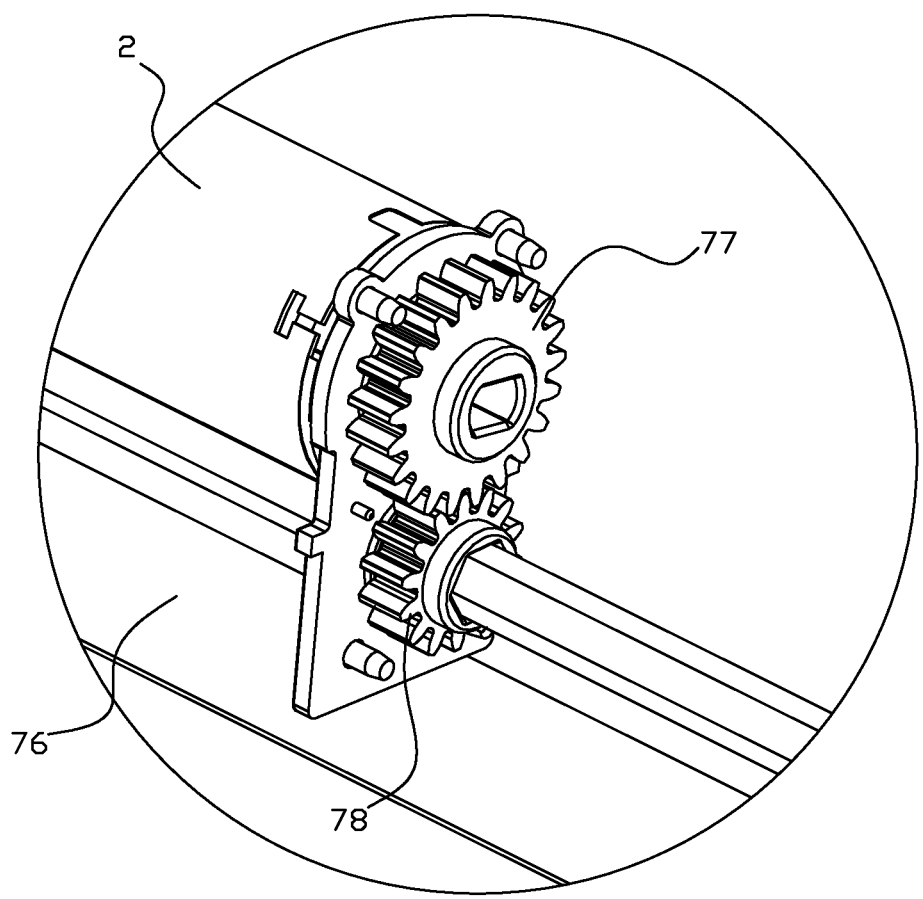
FIG. 11 is a partial blowup view of Section A as depicted in FIG. 10.
Figure 12:
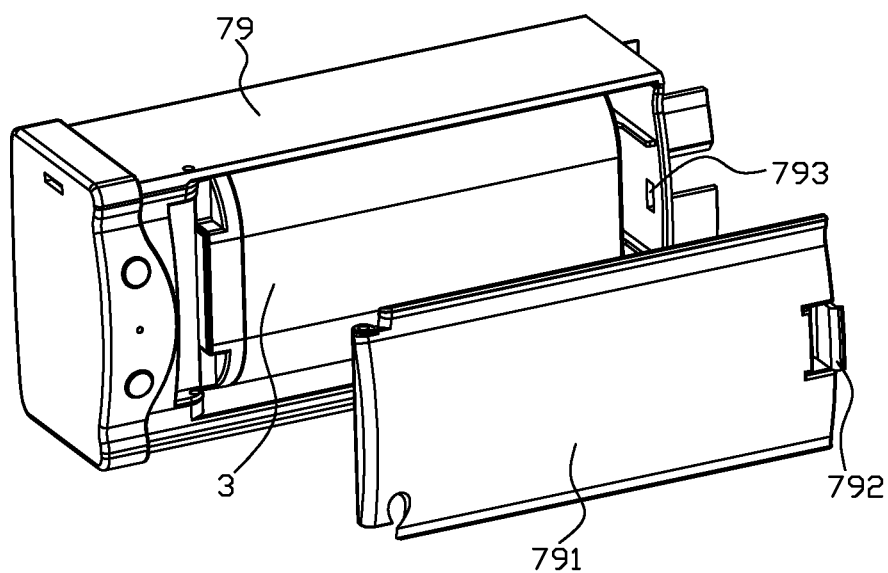
FIG. 12 is an exploded view showing a first cover and a first battery compartment in accordance with the present invention.
Figure 13:
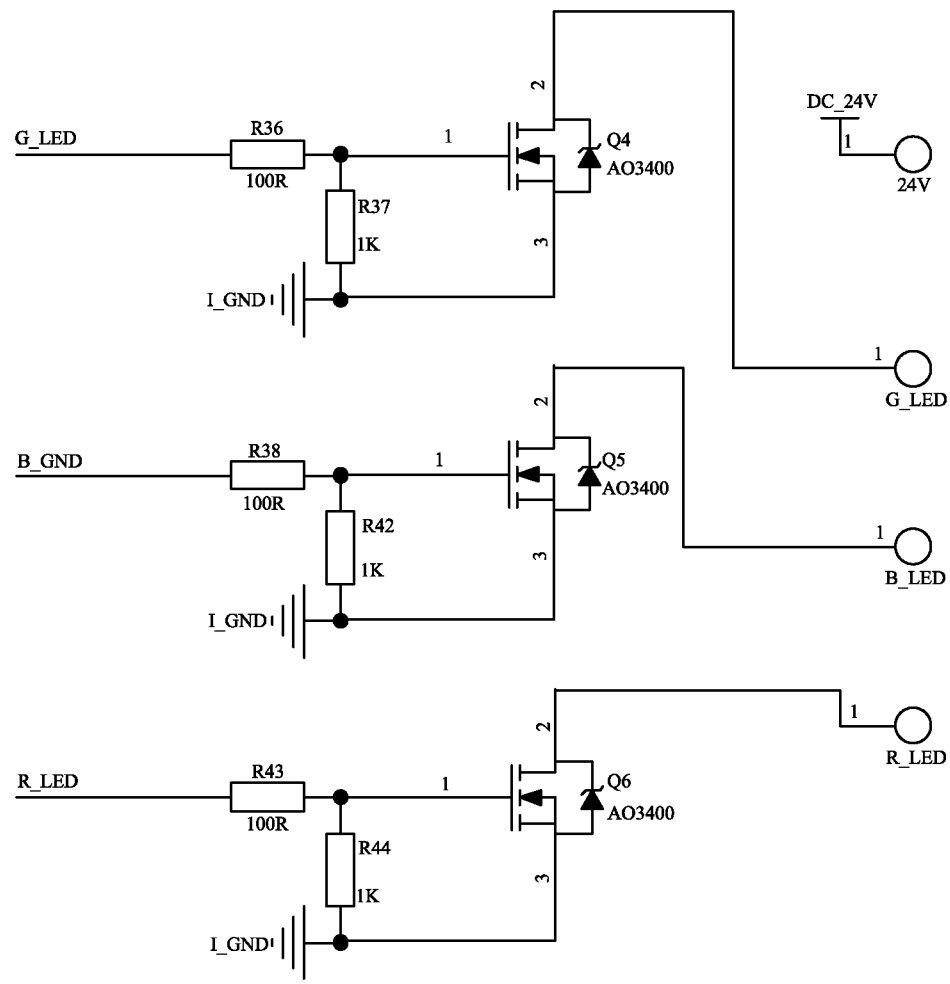
FIG. 13 is a circuit diagram of an LED driving module of the present invention.

A first embodiment of the wireless electric curtain control system is shown in FIGS. 9-13, the smart curtain comprising a first casing 7; the curtain body 1 is coupled to the first casing 7; the motor module 2 is installed at the middle of the first casing 7; both ends of the motor module 2 have a first reel 72 and a second reel 73; the battery 3 and the wireless module are installed at an end of the first casing 7; the first reel 72 and the second reel 73 are transmitted with and coupled to the motor module 2; the first reel 72 and the second reel 73 are wound with a drawstring 74; the first casing 7 has a threading hole 71; and the drawstring 74 is passed through the threading hole 71 and then coupled to the curtain body 1.

Specifically, the smart curtain of this embodiment is a folding curtain or a Venetian curtain. When it is necessary to release or rewind the curtain body 1, users may use a remote control and a wireless repeater to send a command to the smart curtain, and the Zigbee chip U1 receives and processes a command and then sends the processed command (which is a serial command) through the interface P1 to the motor module 2 to rotate the motor module 2 in a forward or reverse direction, so that the first reel 72 and the second reel 73 at both ends of the motor module 2 are driven to rotate in a forward or reverse direction, and the drawstring 74 is wound on the first reel 72 and the second reel 73, or the drawstring 74 falls off from the first reel 72 and the second reel 73 to release or rewind the curtain body 1.

In the wireless electric curtain control system of this embodiment, a light strip 76 is embedded between the curtain body 1 and the first casing 7; the light strip 76 has a light emitting diode (LED) installed therein; the first casing 7 has an LED driving module installed therein and provided for driving the light emitting diode (LED) to emit light; the Zigbee chip U1 is provided for controlling the operation of the LED driving module; the light emitting diode (LED) comprises a R_LED, a G_LED and a B_LED; the LED driving module comprises a MOS tube Q4, a MOS tube Q5 and a MOS tube Q6; the R_LED, G_LED and B_LED are passed through the MOS tube Q6, MOS tube Q5, and MOS tube Q4 respectively and then coupled to the output terminal of the Zigbee chip U1.

Specifically, the wireless electric curtain control system of this embodiment hides the light strip 76 in the curtain body 1 of the smart curtain, so that when the light strip 76 is lit, the color of the curtain body 1 can change with the color of the light strip 76. When it is necessary to control the color of the light strip 76 by the wireless remote control, the Zigbee chip U1 controls the operation of the LED driving module after receiving a signal and triggers the light strip 76 to emit lights of different colors.

Specifically, when it is necessary to change the color of the wireless remote control light strip 76, the Zigbee chip U1 controls the operation of the LED driving module after receiving a signal, so as to control the operating status of the MOS tube Q4, the MOS tube Q5 and the MOS tube Q6 and turn on/off the R_LED, the G_LED and the B_LED, and drive the light strip 76 to emit lights of different colors.

In the wireless electric curtain control system, the first casing 7 is coupled to an external power adaptor 75; the power adaptor 75 is provided for supplying power to the wireless module; the wireless electric curtain control system of this embodiment not just charges the battery 3 through the solar module only, but also charges the battery 3 through the power adaptor 75. When the battery 3 is out of power, the power adaptor 75 is used for supplying power to the smart curtain directly.

The motor module 2 has an output terminal coupled to a first gear 77; the second reel 73 has an input terminal coupled to a second gear 78 which his engaged with the first gear 77; and the second reel 73 and the first reel 72 are transmitted coaxially.

The first casing 7 has a first cover 791 and a first battery compartment 79 for accommodating the battery 3; the first cover 791 has an end hinged to an end of the first battery compartment 79; the first cover 791 has a first elastic hook 792 disposed at the other end thereof; the other end of the first battery compartment 79 has a first slot 793 engaged with the first elastic hook 792; and when it is necessary to replace the battery 3, users just need to remove the first elastic hook 792 from the first slot 793 in order to open the first cover 791 of the first battery compartment 79 and complete the replacement of the battery 3.

Compared with the battery compartment made of metal, the first battery compartment 79 of this embodiment is made of plastic, and the plastic battery compartment 79 can avoid the shielding effect of the a metal battery compartment that interferes the transmission of the control signal.

Figure 14:
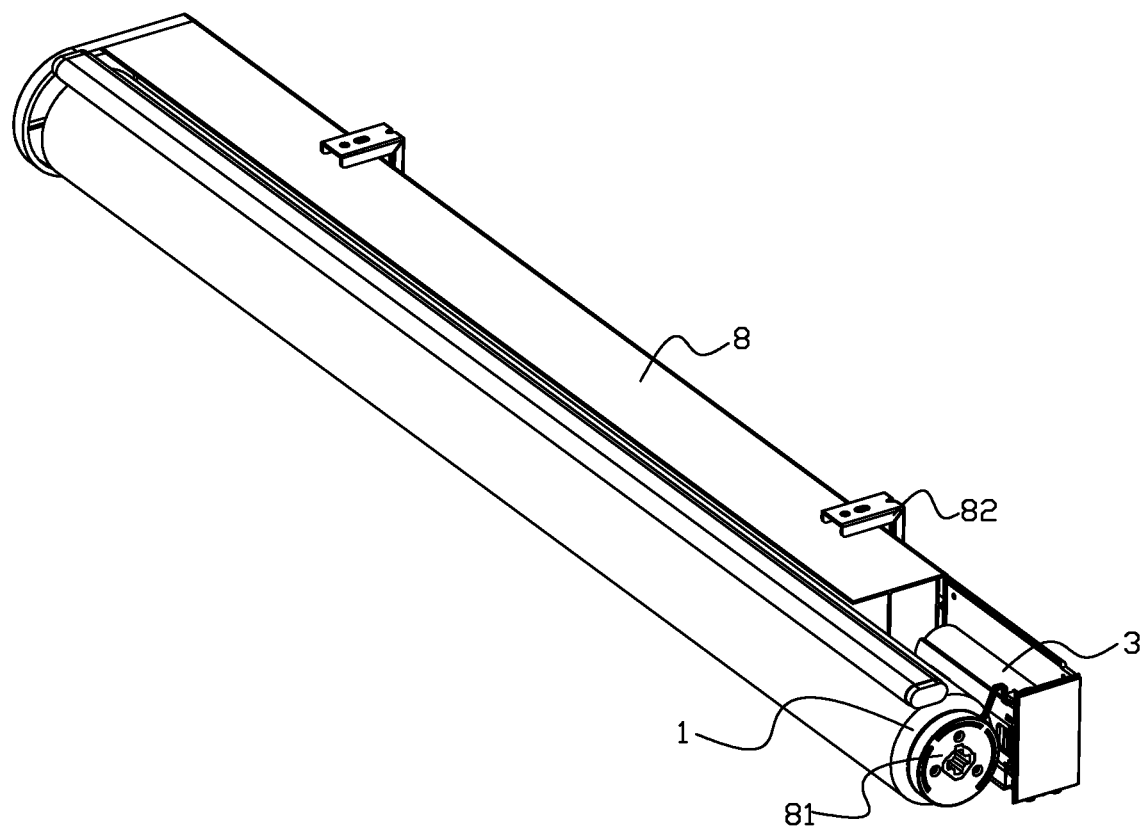
FIG. 14 is a perspective view showing a second casing and a curtain body while a second cover is being hidden in accordance with a second embodiment of the present invention.
Figure 15:
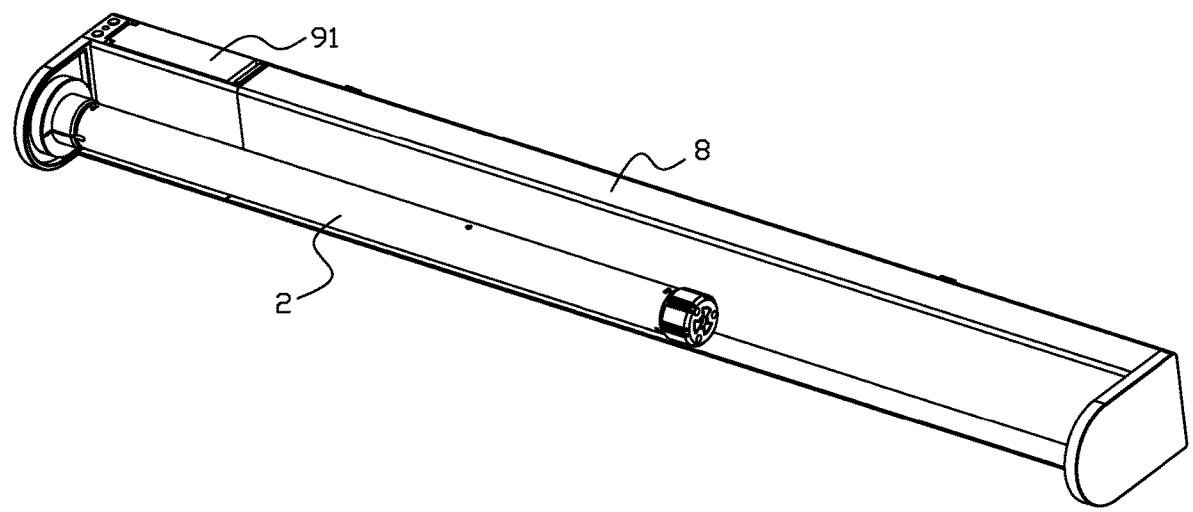
FIG. 15 is a perspective view showing a second casing when a rotating shaft is hidden in accordance with the present invention.
Figure 16:
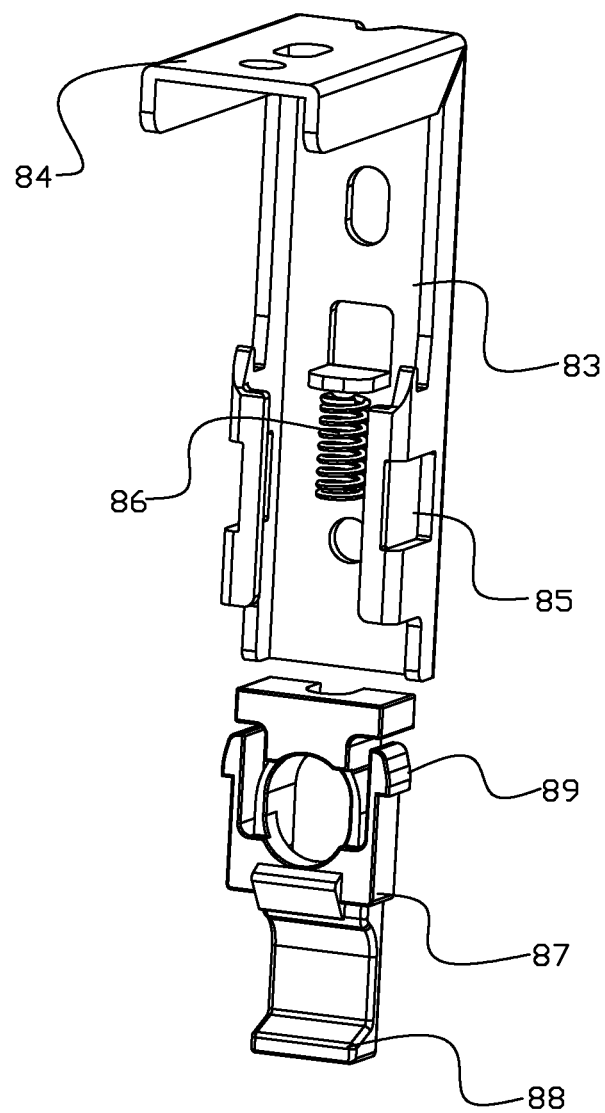
FIG. 16 is an exploded view of a fixing mechanism of the present invention.
Figure 17:
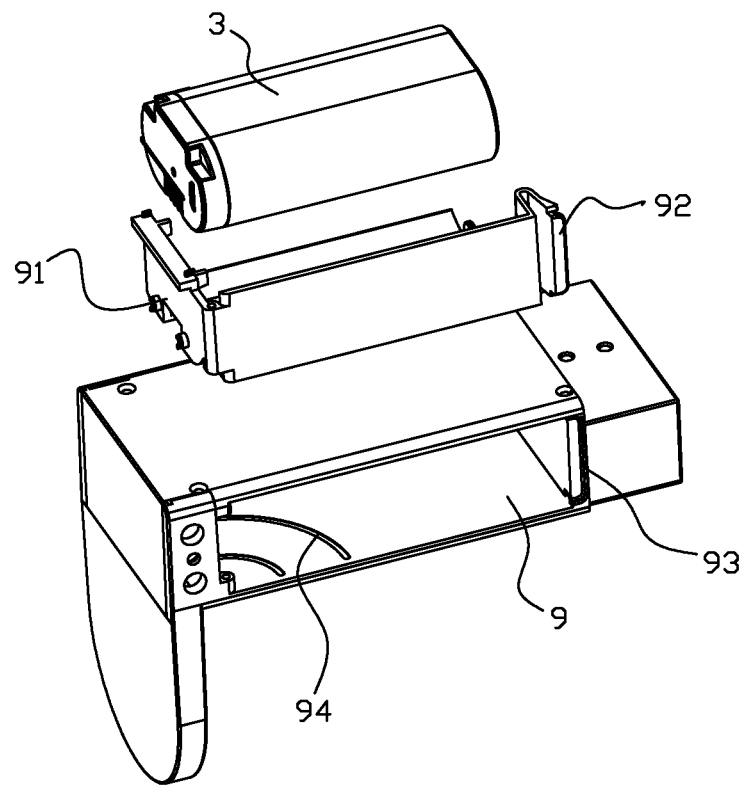
FIG. 17 is an exploded view showing a second cover and a second battery compartment of the present invention.

A second embodiment of the wireless electric curtain control system is shown in FIGS. 14-17, the smart curtain comprising a second casing 8 and a rotating shaft 81 rotatably coupled to the second casing 8; the curtain body 1 is wound on the rotating shaft 81; the motor module 2, the battery 3 and the wireless module are installed in the second casing 8; the motor module 2 has an output terminal transmitted and coupled with the rotating shaft 81; and the smart curtain further comprises a fixing mechanism 82 for fixing the second casing 8.

Specifically, the smart curtain of this embodiment is a roller blind. When it is necessary to release or rewind the curtain body 1, users may use a remote control and a wireless repeater to send a command to the smart curtain, and the Zigbee chip U1 receives and processes the command and then sends the processed command (which is a serial command) through the interface P1 to the motor module 2 to rotate the motor module 2 in a forward or reverse direction, so as to drive the curtain body 1 of the roller blind to ascend or descend. In addition, the fixing mechanism 82 is provided for fixing the second casing 8 on a wall or a window.

In the wireless electric curtain control system of this embodiment, the fixing mechanism 82 comprises an upper clamp 83 and a lower clamp 87 detachably coupled to the upper clamp 83; the upper clamp 83 has an upper clamping plate 84 disposed at the top thereof; the lower clamp 87 has a lower clamping plate 88 disposed at the bottom thereof; the upper clamp 83 has a snap slot 85; the lower clamp 87 has a pushing block and a snap slot 85 configured to be corresponsive to the elastic snap block 89; and a return spring 86 is installed between the pushing block and the upper clamp 83. When it is necessary to fix the wireless electric curtain control system of this embodiment on a wall or a window, the top of the lower clamping plate 88 is abutted against the bottom of the second casing 8 and the top of a fixing frame of the window is abutted against the bottom of the upper clamping plate 84, and then the upper clamp 83 and the lower clamp 87 are engaged until the elastic snap block 89 is engaged with the snap slot 85, so as to fix the casing on the fixing frame of the window. When it is necessary to remove the second casing 8 from the fixing frame of the window, the users simply need to press the elastic snap block 89 to separate the elastic snap block 89 from the snap slot 85 in order to remove the second casing 8. The operation is simple and convenient. With the installation of the return spring 86, the second casing 8 can be removed more easily.

The second casing 8 has a second cover 91 and a second battery compartment 9 for accommodating the battery 3; the second cover 91 has an end hinged to an end of the second battery compartment 9; the second cover 91 has a second elastic hook 92 disposed at the other end thereof; the second battery compartment 9 has a second slot 93 formed at the other end thereof and engaged with the second elastic hook 92. When it is necessary to change the battery 3, the users simply need to separate the second elastic hook 92 from the second slot 93 to open the second cover 91 of the second battery compartment 9 in order to change the battery 3, The second battery compartment 9 has an arc guide slot 94 for guiding the second cover 91 to rotate out from the second battery compartment 9. With the arc guide slot 94, the second cover 91 can be rotated and pushed out from the second battery compartment 9 to facilitate battery change.

Compared with the battery compartment made of metal, the second battery compartment 9 of this embodiment is made of plastic, and the plastic battery compartment can avoid the shielding effect of the a metal battery compartment that interferes the transmission of the control signal.

While the invention has been described by means of specific embodiments, numerous modifications and variations could be made thereto by those skilled in the art without departing from the scope and spirit of the invention set forth in the claims.

What is claimed is:

1. A wireless electric curtain control system, comprising a smart curtain, a wireless repeater and a remote control; the remote control being provided for sending a control signal to the wireless repeater; the wireless repeater being provided for receiving the control signal from the remote control and sending the control signal to the smart curtain;

the smart curtain comprising a curtain body (1), a motor module (2), a solar module, a battery (3), a charging circuit for the solar module to charge the battery (3) and a wireless module; the wireless module being provided for receiving the control signal of the wireless repeater and feeding back the control signal of the wireless repeater to the motor module (2); the charging circuit comprises a charging chip U3; the charging chip U3 has an interface P3 disposed at an input terminal thereof; the interface P3 is coupled to the solar module; the charging chip U3 has an interface P2 disposed at an output terminal thereof; the interface P2 is coupled to the battery (3); and the charging circuit has a first indicating light (4) for indicating the charging status of the battery (3); and the motor module (2) controlling the operation of the curtain body (1) according to the control signal received by the wireless module.

2. The wireless electric curtain control system according to claim 1, wherein the smart curtain further comprises a regulator module and a press button control module; the regulator module comprises a voltage regulator chip U2; the wireless module comprises a Zigbee chip U1; the press button control module comprises an ascending button S1 and a descending button S2; the voltage regulator chip U2 has an input terminal coupled to the battery (3); the voltage regulator chip U2 has an output terminal coupled to a power terminal of the Zigbee chip U1; the ascending button S1 and the descending button S2 are coupled to two input terminals of the Zigbee chip U1 respectively; both ends of the ascending button S1 and both ends of the descending button S2 are coupled to a power supply and grounded; the Zigbee chip U1 has an output terminal coupled to an interface P1; and the interface P1 is coupled to the motor module (2).

3. The wireless electric curtain control system according to claim 2, wherein the smart curtain comprises a first casing (7); the curtain body (1) is coupled to the first casing (7); the motor module (2) is disposed at a middle of the first casing (7); the motor module (2) having ends, each of the ends having one of a first reel (72) and a second reel (73) respectively; the battery (3) and the wireless module are installed at an end of the first casing (7); the first reel (72) and the second reel (73) are transmitted with and coupled to the motor module (2); both of the first reel (72) and the second reel (73) are wound with a drawstring (74); the first casing (7) has a threading hole (71); and the drawstring (74) is coupled to the curtain body (1) after passing through threading hole (71).

4. The wireless electric curtain control system according to claim 3, wherein a light strip (76) is embedded between the curtain body (1) and the first casing (7); the light strip (76) has a light emitting diode (LED) installed therein; the first casing (7) has an LED driving module installed therein for driving the light emitting diode (LED) to emit light; the Zigbee chip U1 is provided for controlling the operation of the LED driving module; the light emitting diode (LED) comprises a R_LED, a G_LED and a BLED; the LED driving module comprises a MOS tube Q4, a MOS tube Q5 and a MOS tube Q6; the R_LED, G_LED and B_LED are coupled to the output terminal of the Zigbee chip U1 after passing through the MOS tube Q6, the MOS tube Q5, and the MOS tube Q4 respectively.

5. The wireless electric curtain control system according to claim 3, wherein the first casing (7) is coupled to an external power adaptor (75); the power adaptor (75) is provided for supplying power to the wireless module; the motor module (2) has an output terminal coupled to a first gear (77); the second reel (73) has an input terminal coupled to a second gear (78) which is engaged with the first gear (77); the second reel (73) and the first reel (72) are transmitted coaxially; the first casing (7) has a first cover (791) and a first battery compartment (79) for accommodating the battery (3); the first cover (791) has a first end hinged to a first end of the first battery compartment (79); a second end of the first cover (791) has a first elastic hook (792); a second end of the first battery compartment (79) has a first slot (793) engaged with the first elastic hook (792); and the first battery compartment (79) is made of plastic.

6. The wireless electric curtain control system according to claim 2, wherein the smart curtain comprises a second casing (8) and a rotating shaft (81) rotatably coupled to the second casing (8); the curtain body (1) is wound on the rotating shaft (81); the motor module (2), the battery (3) and the wireless module are installed in the second casing (8); the motor module (2) has an output terminal transmitted with and coupled to the rotating shaft (81); and the smart curtain further comprises a fixing mechanism (82) for fixing the second casing (8).

7. The wireless electric curtain control system according to claim 6, wherein the fixing mechanism (82) comprises an upper clamp (83) and a lower clamp (87) detachably coupled to the upper clamp (83); the upper clamp (83) has an upper clamping plate (84) disposed at a top thereof; the lower clamp (87) has a lower clamping plate (88) disposed at a bottom thereof; the upper clamp (83) has a snap slot (85); the lower clamp (87) has a pushing block and an elastic snap block (89) corresponding to the snap slot (85); a return spring (86) is installed between the pushing block and the upper clamp (83); the second casing (8) has a second cover (91) and a second battery compartment (9) for accommodating the battery (3); the second cover (91) has a first end hinged to a first end of the second battery compartment (9); the second cover (91) has a second elastic hook (92) disposed at a second end thereof; a second end of the second battery compartment (9) has a second slot (93) engaged with the second elastic hook (92); the second battery compartment (9) has an arc guide slot (94) provided for guiding the second cover (91) to turn and move out from the second battery compartment (9); and the second battery compartment (9) is made of plastic.

8. A wireless electric curtain control system, comprising a smart curtain, a wireless repeater and a remote control; the remote control being provided for sending a control signal to the wireless repeater; the wireless repeater being provided for receiving the control signal from the remote control and sending the control signal to the smart curtain;

the smart curtain comprising a curtain body (1), a motor module (2), and a wireless module; the wireless module being provided for receiving the control signal of the wireless repeater and feeding back the control signal of the wireless repeater to the motor module (2); and the motor module (2) controlling the operation of the curtain body (1) according to the control signal received by the wireless module, wherein the wireless repeater comprises a repeater housing (5) having a Zigbee chip U5 and a voltage regulator chip U4 installed therein; the voltage regulator chip U4 has an input terminal coupled to a power supply; the voltage regulator chip U4 has an output terminal coupled to a power terminal of the Zigbee chip U5; the wireless repeater further comprises a second indicating light (51) for indicating the operating status of the wireless repeater; and the second indicating light (51) is installed onto a surface of the repeater housing (5).

9. A wireless electric curtain control system, comprising a smart curtain, a wireless repeater and a remote control; the remote control being provided for sending a control signal to the wireless repeater; the wireless repeater being provided for receiving the control signal from the remote control and sending the control signal to the smart curtain;

the smart curtain comprising a curtain body (1), a motor module (2), and a wireless module; the wireless module being provided for receiving the control signal of the wireless repeater and feeding back the control signal of the wireless repeater to the motor module (2); and the motor module (2) controlling the operation of the curtain body (1) according to the control signal received by the wireless module, wherein the remote control comprises a remote control housing (6) and a control module, an antenna ANT, a first switch module, a second switch module and a third switch module which are installed in the remote control housing (6); the control module comprises a control chip U6; the control chip U6 has an output terminal coupled to the antenna ANT; the first switch module, the second switch module and the third switch module have a first switch (61), a second switch (62) and a third switch (63) respectively; the first switch (61), the second switch (62) and the third switch (63) are coupled to an input terminal of a control chip U6; the remote control further comprises a flash memory chip U7; and the flash memory chip U7 is coupled to the control chip U6.

* * * * *